United States Patent
Zhang et al.

(10) Patent No.: US 8,529,852 B2
(45) Date of Patent: *Sep. 10, 2013

(54) FLUE-GAS PURIFICATION AND RECLAMATION SYSTEM AND METHOD THEREOF

(76) Inventors: Baoquan Zhang, Fullerton, CA (US); Xiaoqing Zhang, Fullerton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,108

(22) Filed: Mar. 26, 2012

(65) Prior Publication Data

US 2012/0189519 A1   Jul. 26, 2012

Related U.S. Application Data

(63) Continuation-in-part of application No. 13/166,115, filed on Jun. 22, 2011, now Pat. No. 8,168,148, which is a continuation of application No. 12/803,535, filed on Jun. 28, 2010, now Pat. No. 8,110,164.

(51) Int. Cl.
   *B01D 53/34* (2006.01)
   *B01D 53/74* (2006.01)

(52) U.S. Cl.
   USPC ... 423/210; 423/235; 423/243.06; 423/242.1; 423/234; 423/220; 423/215.5; 423/240 R; 423/DIG. 5; 422/111; 422/168; 422/173

(58) Field of Classification Search
   USPC ......... 423/235, 243.06, 242.1, 234, 220, 423/210, DIG. 5, 215.5, 240 R; 422/111, 422/168, 173
   See application file for complete search history.

(56) References Cited

U.S. PATENT DOCUMENTS

| | | | |
|---|---|---|---|
| 5,118,481 A * | 6/1992 | Lyon | 423/235 |
| 5,401,480 A * | 3/1995 | Johnson | 423/243.06 |
| 6,793,903 B1 * | 9/2004 | Parrish | 423/400 |
| 8,110,164 B2 * | 2/2012 | Zhang et al. | 423/210 |
| 8,168,148 B2 * | 5/2012 | Zhang et al. | 423/210 |
| 2010/0068111 A1 * | 3/2010 | Walsh, Jr. | 423/242.1 |

* cited by examiner

*Primary Examiner* — Timothy Vanoy
(74) *Attorney, Agent, or Firm* — Raymond Y. Chan; David and Raymond Patent Firm

(57) ABSTRACT

A flue-gas purification system includes a flue-gas cycling system, a reactor, and an absorbent adding system having at least a catalytic absorbent, wherein the catalytic absorbent is being gasified for reacting with the flue-gas in the reactor in a homogenous gas-gas phase reacting manner. Therefore, the purification system has fast reaction rate between the pollutants of the flue-gas and the catalytic absorbent, which is preferably ammonia, to efficiently remove pollutants, so as to effectively purify the flue-gas.

18 Claims, 3 Drawing Sheets

| Pollutants and its removal rate (%) / cost | | Purification methods | | | |
|---|---|---|---|---|---|
| | | Dry method | Wet method | Half dry-half wet method | Present invention |
| Pollutants and its removal rate (%) | $SO_2$ | 80 | 70-95 | 75-90 | >98 |
| | $NOx$ | 10 | 25-75 | 10-70 | >98 |
| | $CO_2$ | X | X | X | >40 |
| cost | Equ. | High | High | High | Low (1/10 to 1/20 of existing equipments) |
| | Operation | High | High | High | Low (plus the economic benefit of ammonium salts) |
| Advantages | | -No waste water<br>-Minimize secondary pollution<br>-Low corrosive of equipment<br>-High temp. of purified flue-gas having high diffusion rate for being easily discharged | -high sulfur removal rate<br>-high flexibility to incorporate with wider applications | -able to remove the $SO_2$ and $NOx$<br>-high removal rate of sulfur | -remove the $SO_2/NOx/CO_2$ at the same time<br>-high efficiency<br>-high flexibility for incorporating with variety of applications<br>-able to purify high capacity of flue-gas<br>-simple in structure and low cost<br>-low operation fee<br>-low maintenance fee<br>-no waste water or waste acid generated<br>-no secondary pollution<br>-reclamation of the flue-gas |
| Disadvantages | | -slow in reaction rate<br>-low removal rate<br>-bulky and high cost equipments<br>-high operation cost | -high investment<br>-high consuming of power<br>-complicated equipment and installation<br>-high operation cost<br>-secondary pollution | -high investment<br>-high consuming of power<br>-complicated in structure<br>-high operation cost<br>-secondary pollution | |

FIG. 2

FLUE-GAS PURIFICATION AND RECLAMATION SYSTEM AND METHOD THEREOF

CROSS REFERENCE OF RELATED APPLICATION

This is a Continuation-In-Part application that claims the benefit of priority under 35 U.S.C. §119 to a non-provisional application, application Ser. No. 13/166,115, filed Jun. 22, 2011, (now U.S. Pat. No. 8,168,148), which is a Continuation application that claims the benefit of priority under 35 U.S.C. §119 to a non-provisional application, application Ser. No. 12/803,535, filed Jun. 28, 2010, (now U.S. Pat. No. 8,110,164).

BACKGROUND OF THE PRESENT INVENTION

1. Field of Invention

The present invention relates to a system and method of the waste treatment, and more particularly to a flue-gas purification and reclamation system and method, which has high efficient removal rate of pollutants or contaminations in the wastes of flue-gas and to remove two or more contaminations within the flue-gas at the same time.

2. Description of Related Arts

The fossil fuel power plants are mainly provided for generating and supplying the power or energy for most of the manufactures. For example, the manufacture may burn the coal or oil to produce steam for the steam turbines that drives the electricity generator of the manufacture. The exhaust flue-gas from fossil fuel power plants is well known as one of the main pollution culprits or sources. The flue-gas usually contains a plurality of pollutants or contaminations, such as mercury, sulfur dioxide $SO_2$ or other sulfur oxides; nitrogen oxides $NO_x$—NO and $NO_2$; and carbon dioxide $CO_2$ or other carbon oxides.

Those contaminations directly discharge to the atmosphere without being treated to reduce the contaminated contains has damaged the environment of the earth. For instances, the $SO_2$ and $NO_2$ has caused the acid rainfall, which can damage buildings, historical monuments, and has directly linked to the human health; the nitrogen oxides $NO_x$ is also the main reason that cause the Photochemical smog; and the carbon dioxide $CO_2$ has caused the greenhouse effect, which cause the global warming.

In particular, mercury is one kind of heavy metals and is toxic to human beings and animals. Accordingly, large amount of mercury is emitted and polluted to the atmosphere globally, wherein more than 70% of the mercury emission is from coal combustion. Power plants, which are powered by coal combustion, are the major mercury polluting sources globally. Accordingly, mercury and its chemical compounds can enter into the human body through various means such as respiratory, skin and digestive system, resulting in nerve poisoning and human tissue lesions. Since mercury can cumulate in human body for many years, the toxicity may take years to damage the human body. Although the average mercury content in the coal is about 220 ng/g, there requires an enormous amount of coal to complete the coal combustion. As a result, the amount of mercury emission will be rapidly increased, while ecological environment and human health will be concerned due to the mercury pollution. In particular, there are major forms of mercury in the flue gas during coal combustion, which are elemental mercury (Hg0) and mercuric compound ($HgCl_2$, HgO). The industrial mercury control generally uses mercury adsorption to control the amount of mercury emission, such as active carbon adsorption, or calcium-based substance, fly ash, and mineral adsorbents. However, due to the low melting point of elemental mercury, high equilibrium vapor pressure, and low water solubility, mercury cannot be effectively removed from the flue gas. In fact, more than 60% of mercury and its compound in the flue gas will directly release to the atmosphere.

In order to better protect the environment, there are variety of treatments and processes for reducing and minimizing the contamination amount of the industrial wastes mainly from the flue-gas. Traditionally, most of the existing methods for removing the contaminations of the flue-gas are focusing on separately removing the $SO_2$ and NON. There are mainly two types of flue-gas purification for the treatment of removing the sulfur oxides: dry method and wet method of gas purification technologies.

Take the dry desulfurization for instance. The dry desulfurization usually employs solid absorbent or catalyst for removing the sulfur dioxide $SO_2$ of the waste, such as activated carbon adsorption, molecular sieve adsorption, oxidation, and metal oxidation adsorption etc. The advantage of the dry desulfurization is that no discharging of waste water, and/or waste acid, so that the dry desulfurization is able to minimize and reduce the secondary pollution thereof. However, the main concerns are the desulfurization efficiency is low, the equipments of dry desulfurization are bulky and occupy dramatic large space thereof, and the cost of the equipment and it process is high.

Take the wet desulfurization as another example of gas purification. The wet desulfurization for removing the sulfur oxides $SO_2$ includes the limestone-gypsum method, sodium alkali absorption method, ammonia absorption, aluminum method, catalytic oxidation, and catalytic reduction methods. The wet method of the limestone-gypsum method is commonly used worldwide and is the most mature technology for removing the sulfur oxides nowadays.

The limestone-gypsum method is highly efficient of desulfurization and is stable during the process of desulfurizing. The absorbent used in the limestone-gypsum has highly absorbing rate, which is suitable for large amount of waste with high concentration of the sulfur oxides gas, and has high adaptability of the coal. The absorbent of the limestone-gypsum wet method is low in cost. The side products generated from the limestone-gypsum process are able to be utilized for other commercial purposes.

Although the limestone-gypsum method is currently one of the most popular methods having the above mentioned advantages, the limestone-gypsum wet method still occupies too much space and high in manufacturing cost. The process also requires a large amount of water, and generate great amount of waste water and other waste gases, such as waste carbon dioxide and other greenhouse gases, so that it brings the issue of serious secondary pollution. The side products of the wet desulfurization treatment are usually wet, so that it is relatively more difficult for treating the side products therefrom. The waste water from the wet process of the limestone-gypsum has to be treated before discharging. Therefore, the cost of the treatment of the wastes is again increased.

There are relatively more flue-gas treatment technologies for removing the nitrogen oxides, such as selective catalytic reduction (SCR), liquid absorption, microbial absorption, non-selective catalytic reduction, carbon reduction method, catalytic decomposition method, liquid membrane method, SNRB denitrification technology, and feedback oxidation adsorption denitrification technology etc. However, there is only the selective catalytic reduction (SCR) method has been widely applied for the waste treatments.

The selective catalytic reduction method is using the $NH_3$ as the reducing agent to selectively react the $NO_x$ of the waste via catalyst to form non-toxic and pollution free $N_2$ and $H_2O$. Under the temperature range of 200 to 400° C. and the stoichiometric ration of 1:1 of $NH_3$ to $NO_x$, the removal rate of the $NO_x$ is as high as 80 to 90%. However, the catalyst used in this process is high poisoning; and the porous surface of the catalyst tends to be easily clogged up, which is critical to catalyzing reaction, to gradually decrease the removal rate thereof, so that the process is unstable, consumes a large amount of catalyst, and high in operative cost. Furthermore, the selective catalytic reduction method is not suitable for high capacity and high concentration of the $NO_x$ of the waste.

Although the mainstream of the industrial process of flue-gas purification is using wet method for removing the sulfur oxides, and using dry method for removing the $NO_x$, there are some other methods for removing both sulfur oxides and nitrogen oxides. For examples, plasma, electron beam method, CuO method, SNAP method etc. Those methods for moving both $SO_x/NO_x$ at the same time are looking for a treatment that is more efficient and more economic than the methods of separately treating the $SO_x$ and NON. Some of the method for removing both $SO_x/NO_x$ may be able to achieve the desired removal rate. For instance, the industrial art of removing both $SO_x/NO_x$ could be performed by the lime/limestone flue-gas desulfurization FGD system, which is used for removing the SO2 while using the catalytic method SCR for removing the NOx. The above mentioned method for removing both $SO_x/NO_x$ is able to remove 90% of sulfur dioxide and 30 to 80% of nitrogen oxides and combines the wet and dry method, so that the FGD system of the wet method and the SCR system of the dry method are able to independently remove its respective targeted contaminations to achieve each contaminations desired removal rate.

However, the method for removing both $SO_x/NO_x$ via combining the wet and dry methods also inherited the disadvantages of both wet and dry methods as mentioned above. Therefore, the method for removing both $SO_x/NO_x$ tends to be costly in both equipment and operation, require a large amount of water, and have secondary pollution. The activity of the catalyst is gradually decreasing, so that the removing rate keeps decreasing. Most important of all, none of the existing methods consider to remove the carbon dioxide separately or remove the $SO_x/NO_x$ and the carbon dioxide at the same time.

SUMMARY OF THE PRESENT INVENTION

The invention is advantageous in that it provides flue-gas purification and reclamation system and its method thereof, wherein the purification system is able to high efficiently remove the contaminations in the flue-gas.

Another advantage of the invention is to provide flue-gas purification and reclamation system and method, which has the removal rate of removing the $SO_2$, and $NO_2$ as high as 98% or more; and a removal rate of $CO_2$ as high as 30% or more.

Another advantage of the invention is to provide flue-gas purification and reclamation system and method, which is able to remove two or more contaminations in the flue-gas, wherein the system is able to significantly remove both $SO_x$, $NO_x$, and $CO_2$ at the same time.

Another advantage of the invention is to provide flue-gas purification and reclamation system and method, wherein the gas ammonia is reacting with the $SO_2$, $NO_2$, and $CO_2$ within the flue-gas to form the gas-gas phase catalytic acid-base reaction via gas film control. The gas-gas phase reaction between the contaminations and the gas phase ammonia has a reaction rate that is fast enough to be applied to the industrial process for the waste treatment. The ammonia used in the process of the system has high utilization rate. Compare to the gas-solid phase or gas-liquid phase reaction of the limestone method, the gas-gas phase reaction of the ammonia and the contaminations has a relatively higher reacting rate and contamination removal rate.

Another advantage of the invention is to provide flue-gas purification and reclamation system and method, which is able to easily incorporate with most of the new or old type chemical engineering process manufactures.

Another advantage of the invention is to provide flue-gas purification and reclamation system and method, which is small in size, and low cost of the equipments of the system, so as to minimize the requirement of the occupied space of the system.

Another advantage of the invention is to provide flue-gas purification and reclamation system and method, wherein the system is simple for operation and low in operation cost.

Another advantage of the invention is to provide flue-gas purification and reclamation system and method, wherein the ammonia for reacting with the targeted contaminations is inexpensive and has high utilization rate, so as to cost down the process for the waste treatment.

Another advantage of the invention is to provide flue-gas purification and reclamation system and method, wherein the amination purification applied the ammonia to mainly react with $SOx$, $NOx$, $CO_2$, HF, HCl, $HNO_3$, $H_2S$, $H_2SO_4$, $Hg^0$, and $Hg^{2+}$ is suitable for most petroleum fuel, coal, and natural gas related processes.

Another advantage of the invention is to provide flue-gas purification and reclamation system and method, wherein the gasified ammonia is able to firstly involve into the purifying reaction mechanism as a catalyst for reducing the activation energy thereof, and then secondary participating into the purifying reaction process for reacting with the contaminations respectively. Therefore, the process of purification system and method is further simplified and the cost of raw material for reacting with the contaminations is further minimized.

Another advantage of the invention is to provide flue-gas purification and reclamation system and method, wherein no water is required to be used during the process, so that the flue-gas purification system is able to eliminate the process of waste water treatment, so as to conserve water.

Another advantage of the invention is to provide flue-gas purification and reclamation system and method, wherein there is no secondary pollution, so as to cost down the treatment of the purification system of present invention.

Another advantage of the invention is to provide flue-gas purification and reclamation system and method, wherein the system minimizes the clogging phenomena, so as to enhance the stability of the purification system.

Another advantage of the invention is to provide flue-gas purification and reclamation system and method, wherein the products from the reactions of the purification process are solid ammonium salt compounds, wherein after the process of removing the dust to collect the solid ammonium salt compounds, the products are able to be reused or re-processed for variety purposes, such as artificial compound fertilizer, so as to achieve the reclamation of the waste.

Another advantage of the invention is to provide flue-gas purification and reclamation system and method, wherein the purification process has the multi-functions of desulfurization, denitrification, reduction of carbon, and removal of dust, such as the product of the solid ammonium salt compounds.

Another advantage of the invention is to provide flue-gas purification and reclamation system and method, which is able to apply to variety applications. For examples, the purification system is able to apply to the treatment of acid harmful gases, such as hydrogen fluoride and hydrogen chloride; and the purification system is able to be used for the treatment of waste gas from the car.

Additional advantages and features of the invention will become apparent from the description which follows, and may be realized by means of the instrumentalities and combinations particular point out in the appended claims.

According to the present invention, the foregoing and other objects and advantages are attained by providing a flue-gas purification system, which comprises:

a reactor;

a flue-gas cycling system, which has a channel having a delivering opening for conveying exhaust flue-gas from said channel to said reactor;

an absorbent adding system containing at least a catalytic absorbent, wherein said catalytic absorbent is being gasified to a gas phase and being delivered into said reactor, in such a manner that a plurality of pollutants of the flue-gas are able to react with said catalytic adsorbent under a homogenous gas-gas phase condition to form products of non-toxic compounds, so as to efficiently purify the flue-gas.

In accordance with another aspect of the invention, the present invention also provides a method for purifying the flue-gas, which comprises the following steps.

(A) Convey the flue-gas from the delivering opening of the channel of the flue-gas cycling system into the reactor.

(B) Gasify the catalytic absorbent of the absorbent adding system to the gas phase thereof and convey the gasified catalytic absorbent into the reactor. Therefore, the catalytic absorbent, preferably the gas phase ammonia, is able to react with the pollutants in the flue-gas for removing the pollutants, so as to purify the flue-gas when the flue-gas exits the reactor.

(C) Discharge the purified flue-gas into the air ambient.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 2 is a table of the comparisons of removal rate and efficiency of pollutants between the traditional technologies and the present purification system.

DETAILED DESCRIPTION OF THE PREFERRED EMBODIMENT

Figure 1:
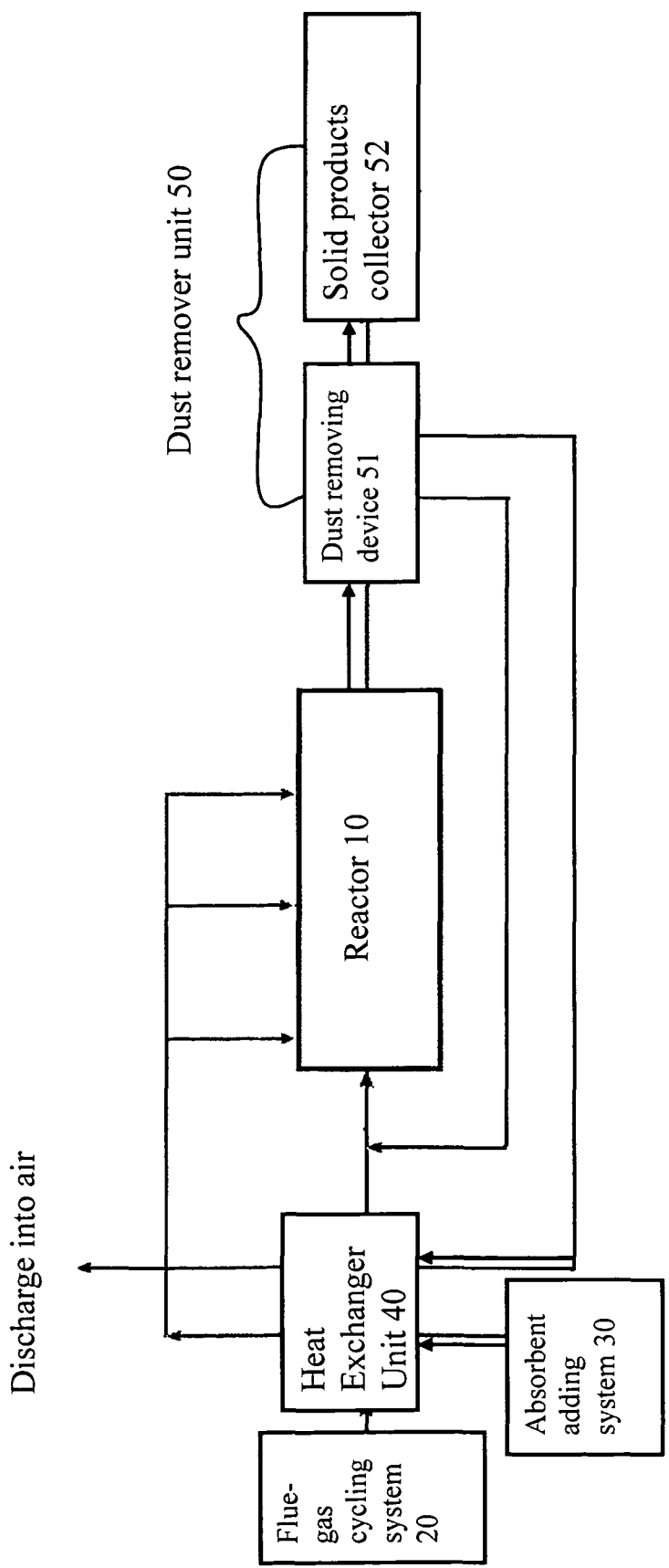
FIG. 1 is a block diagram of a flue-gas purification system according to a preferred embodiment of the present invention.

Referring to FIG. 1 of the drawing, a flue-gas purification system according to a preferred embodiment of the present invention is illustrated, wherein the flue-gas purification system comprises at least a reactor 10, a flue-gas cycling system 20, and an absorbent adding system 30.

The flue-gas cycling system 20 has at least a channel having a delivering opening for conveying exhaust flue-gas from the flue-gas cycling system 20 into the reactor 10.

The absorbent adding system 30 operatively communicating with the reactor 10, wherein the absorbent adding system 30 contains at least a catalytic absorbent and arranged for delivering the catalytic absorbent from the absorbent adding system 30 into the reactor 10. Before the catalytic absorbent being delivered into the reactor 10, the catalytic absorbent is preferably being gasified to the gas phase, so that the absorbent is able to react with the flue-gas in a homogenous gas-gas phase manner, so as to dramatically increase the reaction rate thereof.

The catalytic absorbent is preferably ammonia, wherein the ammonia being gasified to the gas phase is able to react with the contaminations within the flue-gas in a reaction rate, which is able to apply to the chemical process for industrial applications. The gas phase ammonia is able to quickly react with the pollutants of the flue-gas to form variety of non-toxic compounds. For examples, the gasified ammonia is able to react with the sulfur dioxide $SO_2$ to form ammonium sulfate (($NH_4)_2SO_4$); the gasified ammonia is able to react with the nitrogen oxides NOx to form ammonium nitrate ($NH_4NO_3$); and the gasified ammonia is able to react with the carbon dioxide $CO_2$ to form ammonium carbonate (($NH_4)_2CO_3$). Other compounds may be also formed by the series reactions of the catalytic absorbent and flue-gas, such as the fly ash. More details of each of the reactions within the reactor 10 will be described later.

As will be readily appreciated that using the ammonia as the catalytic absorbent not only can remove the harmful pollutants, such as SOx, NOx, $CO_2$, HF, HCl, $HNO_3$, $H_2S$, $H_2SO_4$, $Hg^0$, and $Hg^{2+}$, but also can form the non-toxic final products from the reactants of ammonia and the pollutants in the flue-gas. The final products, such as the above mentioned ammonium salts, can be used as fertilizers, so that the flue-gas purification system is able to purify and recycle the pollutants of the flue-gas, so as to achieve the reclamation purpose. Therefore, the final products can be recycled to form the useful chemical raw material for recycling use.

It should be noted that the reactions of the gas phase flue-gas and the gas phase of the catalytic absorbent are fast chemical reactions that are able to efficiently consume the pollutants within the flue-gas via the absorption processes of catalytic oxidation reactions, photolysis, complex chin reactions, and/or the dust removal process. There are no extra other natural sources are needed or involved in the purification system of the present invention. There is no wastewater or other secondary pollutions of the side products of the reactions are generated. Thereby, the purification system is able to high efficiently remove the pollutants within the flue-gas.

In the preferred embodiment of the present invention, the reactor 10 is preferably a Venturi homogenous gas-gas phase reactor 10, which has the Venturi type design for the gas phase ammonia being able to fully mix and contact with the gas phase flue-gas to maximize the efficiency of the reactions therebetween.

Accordingly, a heat exchanger unit 40 is further provided for efficiently supplying the predetermined heat energy to gasify liquid phase ammonia into gas phase thereof before the ammonia entering the reactor 10.

The heat exchanger unit 40 is preferably arranged that the flue-gas is entering the heat exchanger unit 40 for being conveyed into the reactor 10, wherein the flue-gas, which is normally has a temperature around 120 to 160° C. at the delivering opening of the channel of the flue-gas cycling system 10, is arranged to flow within the heat exchanger unit 40 as a heat transfer medium, in such a manner that the heat exchanger unit 40 is able to efficiently employ the heat energy from the flue-gas itself to gasify the ammonia substantially without significant extra energy or power for gasifying the ammonia, so as to cool down the flue-gas to a desired temperature.

In other words, the heat exchanger unit 40 basically has at least two sets of pipes, wherein the first set of pipes allow the flue-gas to enter an input end of the first set of pipes and exit an output end of the first set of pipes to enter into the reactor 10, while the second set of pipes convey the liquid phase of the ammonia entering an input end of the second set of pipes and exit an output end of the second set of pipes with the gas phase ammonia. Thereby, the flue-gas with higher temperature within the first set of the pipes is arranged as a heat exchange medium for heating the liquid phase of the ammonia within the second set of pips to heat exchange therewith, so as to gasify the ammonia from liquid phase to the gas phase. Therefore, the flue-gas is able to quickly react with the gas phase ammonia of the catalytic absorbent for being purified.

It is worth to mention that through the heat exchanger unit 40, the ammonia is able to absorb the heat from the higher temperature of the flue-gas, so as to efficiently utilize the internal energy of the purification system to gasify the liquid phase ammonia. The heat exchanger unit 40 is also able to convey the gasified ammonia and the cooled flue-gas into the reactor 10 for reacting with each other in the gas-gas phase reacting manner.

As will be readily appreciated that the catalytic absorbent, which is embodied as gasified ammonia, is preferably being delivered into the reactor 10 in a three stages manner. In other words, each of the stages has a specific reactive conditions, such as a predetermined temperature, concentration, and/or pressure, for mainly purifying a targeted contamination of the flue-gas, so that the variety reactive conditions of each of the reacting stages are able to further enhance the reaction rate, so as to purify multiple contaminations substantially at the same time via the single purification system of the present invention.

For instance, the sulfur dioxide is being delivered into the first stage for essentially fully reacting with the ammonia, wherein the sulfur dioxide may further being conveyed into the second stages in the reactor 10 for further reacting with the ammonia while the second stage is designed with the predetermined reactive conditions for mainly reacting with nitrogen dioxide, in such a manner that the purification system of the present invention is able to efficiently and simultaneously purify two or more contaminations. Therefore, the gas-gas phase reactions between contaminations of the flue-gas and the ammonia in the reactor 10 is preferably arranged to form the two levels and three stages fully contacting arrangement to have more efficient purification system.

Accordingly, a dust remover unit 50 is preferably provided for collecting and removing the dust from the flue-gas or the products generated from the reactions within the reactor 10. The dust, which may include the fly ash within the flue-gas and the ammonium salts, which is formed via the reactions of the gas-gas phase reactants of the flue-gas and the catalytic absorbent. Therefore, the pollutants of the flue-gas are reacted with the gas phase ammonia in the reactor 10 for removing the pollutants and purifying the flue-gas. After the reactions are substantially finished, the dust remover unit 50 is able to remove the fly ash and the ammonium salts of the dust from the flue-gas before the flue-gas being discharged into the air ambient.

The dust remover unit 50 may further comprise a dust removing device 51 for removing the dust and a solid product collector 52 mainly for the compounds of ammonium salts generated from the reactions between the pollutants and the catalytic absorbent. Therefore, the flue-gas being purified by the reactor 10 and filtered by the dust removing device 51 of the dust remover unit 50 is able to discharge into the atmosphere with relatively cleaner gas. The ammonium salts are able to be further separated and collected via the solid product collector 52 for reclamation, such as reuse the collected ammonium salts for using as the fertilizer.

After separating the dust and the purified flue-gas, the purified flue-gas is further conveyed to pass through a fog separator 53 for separating the gas ammonia and the purified flue-gas. The gas ammonia is then being redirected to enter into the flue-gas cycling system for recycling the ammonia, and the purified flue-gas is being delivered into the heat exchanger unit 40 for being further cooled down to a predetermined temperature before being discharged into the air ambient. The purified flue-gas is further being cooled via the heat exchanger unit 40 and then being exhausted into the atmosphere therefrom.

Accordingly, the dust within the reactor 10, which is from the ash and the solid ammonium salt compounds of the products of the reactions, is preferably entering a Venturi tube of the Venturi type reactor 10 for being gradually concentrated, and then through the collisions and aggregation processes, the sizes of the particles of the dust are increased to the predetermined sizes, so that the dust removing device 51 is able to remove and separate the dust from the flue-gas. The dust removing device 51 may be an electrostatic precipitator or a bag type dust remover for collecting and/or removing the dust from the flue-gas.

In addition, the pollutants of the flue gas are converted into the solid compounds of the final products, wherein UV (ultra-violet) light is provided to enhance the reaction rate of the process to form the solid compounds of the final products from the pollutants of the flue gas. In other words, the pollutants of the flue gas are reacted with the catalytic absorbent under the UV light environment to speed up the reaction rate.

The purification system may further comprises a monitoring system 60, wherein the monitoring system 60 is able to monitor variety of temperatures, concentrations, pressures, and other parameters at variety of check points of the purification system, so as to control the purification system. Therefore, the flue-gas of the flue-gas cycling system 10 normally has a temperature around 120 to 160° C. before entering into the heat exchanger unit 40, a temperature around 60 to 80° C. after exiting the heat exchanger unit 40 and before entering the reactor 10, and a temperature around 25 to 50° C. after final exiting the heat exchanger 10 after reacted with the catalytic absorbent in the reactor 10. In other words, the purified flue-gas is about 25 to 50° C. when exiting the purification system and being discharged into the air.

The monitoring system 60 may be further electrically linked to the catalytic absorbent adding system 30, wherein the absorbent adding system 30 is able to automatically add a predetermined amount of the catalytic absorbent into the heat exchanger 40 in responsive to the concentrations of each of pollutants or contaminations of the flue gas before entering and/or after entering the reactor 10, the temperatures, pressures, and other parameters measured via the monitoring system 60, so as to form a automatic self-absorbent-flow-rate control system. Therefore, the monitoring system 60 is able to collect the parameters at any measuring points of the purification system, such as temperature and pressure of flue-gas before entering the reactor 10; or concentration of gas ammonia in the first stage within the reactor 10.

Accordingly, the gasified ammonia of the catalytic absorbent is able to react with the steam or water vapor ($H_2O_{(g)}$)

within the flue-gas to form the ammonium water complex ($NH_3 \cdot H_2O$), so that the SOx, NOx, and COx, such as $SO_2$, $NO_2$, and $CO_2$, are able to quickly react with the ammonium water complex to occur gas-phase homogeneous nucleation reactions, so as to achieve the removal of the $SO_2$, $NO_2$, and $CO_2$ of pollutants of the flue-gas. The volume ratio of the water vapor and ammonium gas (gasified ammonia) is about 1:100. The volume ratio of the gasified ammonia and the oxygen contained matter is 0 to 100.

It will be readily appreciated that normally the flue-gas contains 50% of $N_2$, 8% of $O_2$, 30% of $CO_2$, 9% of $H_2O$, and other gases of pollutants in the flue-gas, such as sulfur dioxides, nitrogen oxides, and fly ash. Theoretically, the $H_2O_{(g)}$ is able to react with the $SO_2$, $NO_2$, and $CO_2$, the reactions between $SO_2$, $NO_2$, and $CO_2$ and the steam water is extremely slow that it is impossible to directly utilize to the industrial applications. Under the added catalytic absorbent, embodied as gas phase ammonia, the water molecular $H_2O$ and ammonia molecular $NH_3$ are able to form the ammonium water complex ($NH_3 \cdot H_2O$) through the hydrogen-bond therebetween, so as to quickly further react with the contaminations of flue-gas to remove the SOx, NOx, and $CO_2$.

Accordingly, the reactions of each of the pollutants and the catalytic absorbent are described as followings.

The nitrogen oxides of the pollutant of the flue-gas are being removed via a series of denitrification processes. The NO in the flue-gas is first being oxidized to form the $NO_2$. The $NO_2$ is reacting with the water molecular within the $NH_3 \cdot H_2O$ via the reduction-oxidation reaction to form the nucleation reaction to form the solid phase ammonium nitrate and gas phase nitrite, wherein partial of the nitrite further reacts with the ammonia to form the nitrate. The reaction of the nitrogen oxides and the water molecular of the ammonium water complex via the ammonia catalyst is shown below:

$$2NO+O_2 \rightarrow 2NO_2$$

$$2NO_2+NH_3-H_2O \rightarrow NH_4NO_3+HNO_2$$

$$HNO_2+NH_3 \rightarrow NH_4NO_2$$

The sulfur oxides removal is through a series of multi-chemical processes, which involves acid-base reactions, oxidation reactions, radical reactions, and chain reactions.

The acid-base reactions of the sulfur dioxides is through nucleation reaction of the sulfur dioxides reacting with $NH_3$—$H_2O$, which is endothermic reaction, to form the solid $NH_4HSO_3$ and ammonium sulfite $(NH_4)_2SO_3$. The reaction equations are shown in the following:

$$NH_3-H_2Og_{(Gas)}+SO_2g_{(Gas)} \rightarrow NH_4HSO_{3s}$$

$$2NH_3-H_2Og_{(Gas)}+SO_2g_{(Gas)} \rightarrow (NH_4)_2SO_3$$

The oxidation reaction: the $NH_4HSO_3$ and the $(NH_4)_2SO_3$ are oxidized via the oxygen, carbon dioxides, and ammonium nitrate to form the $NH_4HSO_3$ and ammonium sulfite $(NH_4)_2SO_3$. The reaction equations are shown in the following:

$$NH_4HSO_{3s}+O_{2g} \rightarrow NH_4HSO_{4s}$$

$$NH_4HSO_{4s}+NH_3 \rightarrow (NH_4)_2SO_4$$

$$NH_4HSO_{3s}+NO_{2g} \rightarrow NH_4HSO_{4s}+NO$$

$$NH_4NO_3+NH_4HSO_3 \rightarrow (NH_4)_2SO_4+HNO_{2g}$$

The chain reaction equations of the sulfur oxides are also shown in the following:

$$HONO_g+hv \rightarrow OH+NO$$

$$OH+SO_2 \rightarrow H_2SO_4$$

$$NH_3+H_2SO_4 \rightarrow NH_4HSO_4$$

$$NH_3+NH_4HSO_4 \rightarrow (NH_4)_2SO_4$$

Therefore, through the processes of acid-base reactions, oxidation reactions, radical reactions, and chain reactions, the sulfur oxides of the pollutants in the flue-gas are able to be removed after the series desulfurization reactions within the reactor 10.

The decarbonization process is further involved in the series reactions of contaminations removal in the reactor 10, wherein the carbon dioxide, which may be hard to react with gas or liquid phase water molecular, are able to collide with the $NH_3$—$H_2O$ to start the homogeneous nucleation reactions to form the solid phase compounds of $NH_4HCO_3$ and the ammonium carbonate $(NH_4)_2CO_3$, so as to remove the carbon oxides and to form the products of ammonium salts, which is able to be recycled for being reused as fertilizer. The reaction equations are shown in the following:

$$CO_2+NH_3-H_2O \rightarrow NH_4HCO_3$$

$$NH_4HCO_3+NH_3 \rightarrow (NH_4)_2CO_3$$

The process is involved in the series reactions of contaminations removal in the reactor 10, wherein the pollutants of the flue-gas comprises mercury, which is being removed through a series of multi-chemical processes comprising acid-base reactions, oxidation reactions, and chain reactions, in mercury reactor having the chemical equation below:

$$Hg+NO_2 \rightarrow HgO+NO$$

$$HgO+NH_3 \rightarrow Hg(NH_3)nO \; n=3,4$$

$$Hg(NH_3)_3O+4SO_2+3H_2O \rightarrow HgSO_3+3NH_3HSO_3$$

$$HgSO_3+O \rightarrow HgSO_4$$

$$NH_3HSO_3+O \rightarrow NH_3HSO_4$$

Figure 3:
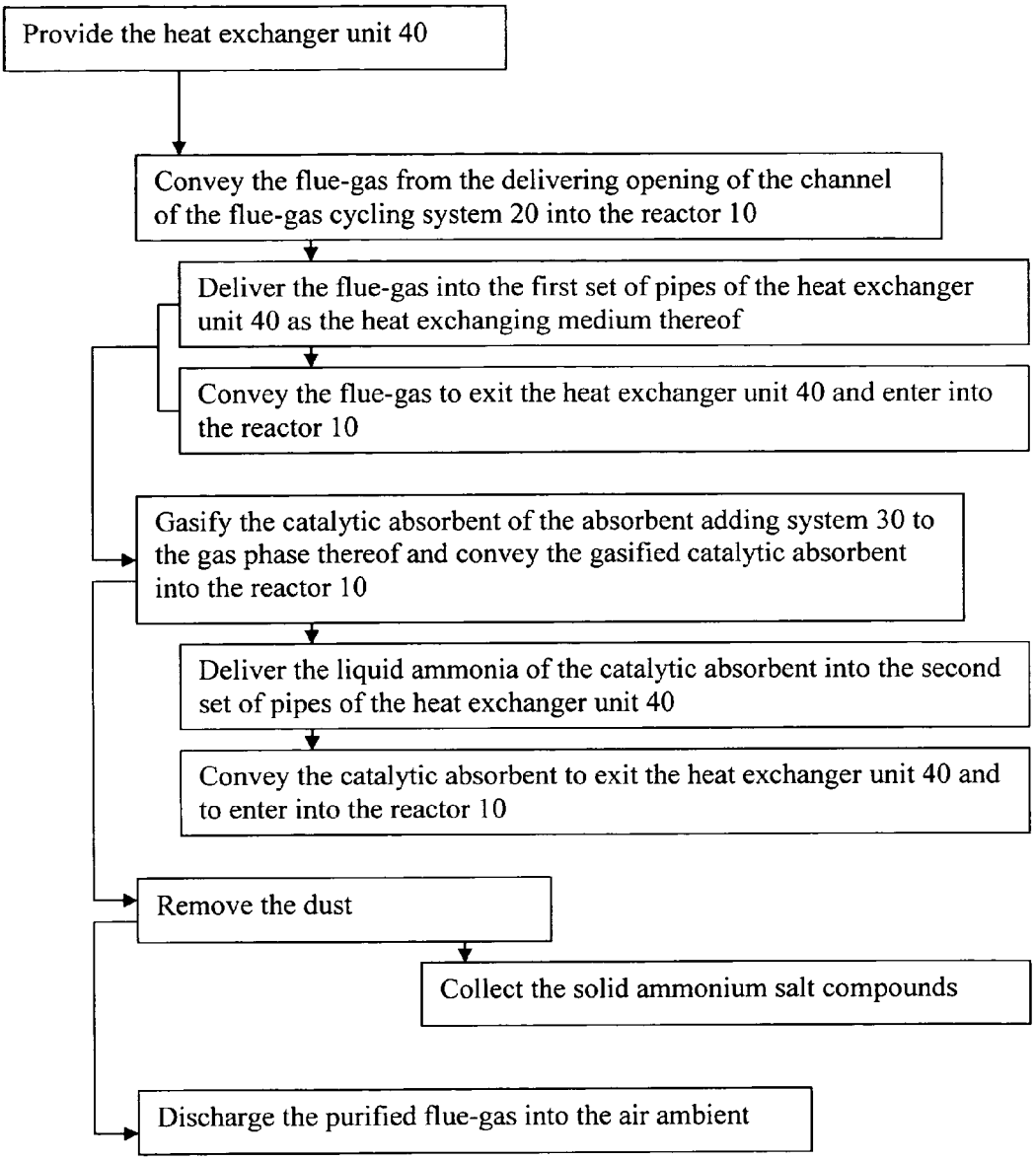
FIG. 3 is a flow chart of a flue-gas purification method according to the preferred embodiment of the present invention.

Referring to FIG. 3 of the drawings, a method of purifying flue-gas according to the preferred embodiment of the present invention is illustrated, wherein the method comprises the following steps.

(A) Convey the flue-gas from the delivering opening of the channel of the flue-gas cycling system 20 into the reactor 10.

(B) Gasify the catalytic absorbent of the absorbent adding system 30 to the gas phase thereof and convey the gasified catalytic absorbent into the reactor 10. Therefore, the catalytic absorbent, preferably the gas phase ammonia, is able to react with the pollutants in the flue-gas for removing the pollutants, so as to purify the flue-gas when the flue-gas exits the reactor.

(C) Discharge the purified flue-gas into the air ambient.

Before the step (C), the method may further comprises a step of removing dust in the reactor via the dust remover unit 50, so that the dust, including the fly ash and the yield solid phase products from the series reactions within the reactor 10, is able to be removed to further purify the flue-gas, so as to prevent the dust clogging the system. The dust may be separated from the purified flue-gas via the dust removing device 51 as mentioned above.

After the step of removing the dust, a step of collecting the solid ammonium salt compounds and other solid particles via the solid product collector 52 may further provided, so that the solid products generated in the reactor 10 is able to be further utilized as another usage, such as ammonium fertilizer.

According to the preferred embodiment of the present invention, before the step (A), a step of providing the heat exchanger unit 40 may further provided. Therefore, the step (A) may further comprises a step of delivering the flue-gas into the first set of pipes of the heat exchanger unit 40 as the heat exchanging medium thereof; and conveying the flue-gas to exit the heat exchanger unit 40 and enter into the reactor 10.

The step (B) may further comprises a step of delivering the liquid ammonia of the catalytic absorbent into the second set of pipes of the heat exchanger unit 40, so that the liquid ammonia is able to absorb the predetermine amount of heat energy from the heat exchanging medium of the flue-gas in the first set of pipes for being gasified. The step (B) further comprises a step of conveying the catalytic absorbent to exit the heat exchanger unit 40 and to enter into the reactor 10.

The step (B) further comprises a step of providing a UV (ultraviolet) light to enhance a reaction rate of the final products in solid state being formed the pollutants of the flue-gas under UV environment. Accordingly, the pollutants of the flue gas are converted into the solid compounds of the final products, wherein UV (ultraviolet) light is provided to enhance the reaction rate of the process to form the solid compounds of the final products from the pollutants of the flue gas. In other words, the pollutants of the flue gas are reacted with the catalytic absorbent under the UV light environment to speed up the reaction rate.

It is worth to mention that the ammonia of the catalytic absorbent is preferably to be delivered into the reactor in the above mentioned three stages manner, so as to maximize the reaction rate between the absorbent and each of the pollutants of the flue-gas. Therefore, the purification system is able to obtain a relatively higher removal rate of the contaminations of the flue-gas.

Accordingly, the method may further comprises a step of delivering said catalytic absorbent into said reactor in a multiple stages manner, such as above mentioned three stages manner, and preferably at least two or more stages, so that each stages is able to target specific pollutants of the flue-gas to maximize the purification rate of each of the pollutants. Therefore, the method is able to achieve purifying multiple pollutants in the flue-gas at the same time via the same reactor 10 and the purification system. There is no need for building and purchasing another equipment or system for removing variety of pollutants of flue-gas. Thereby, the equipment cost of the facility or manufacture is minimized, and meanwhile, the required area for building the purification system is minimized.

Before the step of discharging the purified flue-gas and after the step of removing dust, a step of separating the gas ammonia and the purified flue-gas may further provided, wherein the ammonia is able to be redirected into the flue-gas cycling system 10 for being reused and the purified flue-gas is able to be directed to the heat exchanger 40 for being further cooled to the predetermined temperature to be discharged into the air therefrom.

In the preferred embodiment of the present invention, a step of providing the monitoring system 60 may further provided, wherein the monitoring system 60 is able to detect the temperatures, pressures, concentrations of each of the pollutants of the flue-gas at variety of check points of the purification system, so as to further monitor the system for enhancing efficiency and safety thereof. The monitoring system 60 is able to electrically link with the absorbent adding system 30 for controllably, automatically, and continuously adding the predetermined amount of the catalytic absorbent into heat exchanger unit 40 as described above.

Therefore, the purification system of the present invention has at least the following advantages.

1. There is substantially no significant external energy is required. The heat exchanger is able to utilize the internal heat energy of the flue-gas of the purification system to gasify the ammonia, so as to save the energy.

2. The gas-gas phase homogenous reactions between the gasified ammonia and the flue-gas has fast reaction rate and high yield rate of the products of ammonium salt compounds of the reactions, so that the purification system is able to high efficiently remove the pollutants in the flue-gas. The $SO_2$, $NO_2$ of the pollutants removal rate are higher than 98%, and the $CO_2$ is higher than 30%. The removal rate, compare to the existing methods as shown in FIG. 2, is significantly improved and enhanced.

3. The main consumed chemical compound is the ammonia of the absorbent, which is cheap and has highly reusable rate, so as to minimize the cost of the purification operation.

4. The entirely equipments, such as the reactor 10, the absorbent adding system 30, the heat exchanger unit 40, and the dust remover unit 50, occupied relatively smaller spaces, and are simple in structure, so that the installation and the equipments costs are minimized.

Furthermore, the signal purification system has multi-functions of desulfurization, denitrification, reduction of carbon, and removal of dust, so that the purification system not only enhance the efficiency of purifying the pollutants of the flue-gas, but also minimize the spaces required for building the purification system of present invention.

5. The purification system has high flexibility for incorporating with variety of applications or facilities, so that the purification system is able to be widely applied in variety industrial fields. For examples, the purification system is able to apply to the treatment of acid harmful gases, such as hydrogen fluoride and hydrogen chloride; and the purification system is able to be used for the treatment of waste gas from the car.

6. No water is required for purifying the flue-gas, so that the purification system is able to conserve the natural source of water. No waste water or any other types of secondary wastes are formed via the purifying process of the purification system, so that the flue-gas purification system is able to eliminate the process of secondary waste treatment.

7. No strong corrosive chemical compounds added into or generated from the reactions, so that the equipments of the purification system has relatively longer usage life. The dust remover unit is able to collect and remove the dust, such as fly ash and any other solid particles, so that the clogging issue is minimized, so as to enhance the stability during the operation of the purification system and to cost down the maintenance fee thereof.

8. The ammonium salt compounds generated from the reactions of the purifying process are able to be further reused, so that the flue-gas not only can be purified but also be reclaimed.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A flue-gas purification system, comprising:
a reactor;
a flue-gas cycling system for conveying at least one exhaust flue-gas to said reactor; and
an absorbent adding system containing at least a catalytic absorbent in gas phase for reacting a plurality of pollutants of said flue-gas in said reactor to form a series of reactions in a water-less consuming manner and a reacting temperature of said catalytic absorbent reacting with said pollutants of said flue-gas is 140° C. or less, so as to form final products in solid state after said series reactions to efficiently purify said flue-gas.

2. The flue-gas purification system, as recited in claim 1, wherein said catalytic absorbent is a mixture of gasified ammonia and an oxygen contained matter.

3. The flue-gas purification system, as recited in claim 2, wherein a volume ratio of said gasified ammonia and said oxygen contained matter is 0 to 100.

4. The flue-gas purification system, as recited in claim 2, wherein said oxygen contained matter is selected from a group consisting of oxygen, air, oxidized air, gasified hydrogen peroxide, and ozone.

5. The flue-gas purification system, as recited in claim 1, wherein said pollutants of said flue-gas is selected from a group consisting of SOx, NOx, $CO_2$, HF, HCl, $HNO_3$, $H_2S$, $H_2SO_4$, $Hg^0$, $Hg^{2+}$, which being removed via a series of processes.

6. The flue-gas purification system, as recited in claim 1, wherein said final products in solid state is formed said pollutants of said flue-gas under UV environment to enhance a reaction rate thereof.

7. The flue-gas purification system, as recited in claim 1, wherein said pollutants of said flue-gas comprises mercury, which is being removed via a process in said reactor having chemical equations of said series reactions in said reactor below:

$$Hg+NO_2 \rightarrow HgO+NO$$

$$HgO+NH3 \rightarrow Hg(NH_3)nO \text{ wherein } n=3,4$$

$$Hg(NH3)_3O+4SO_2+3H_2O \rightarrow HgSO_3+3NH_3HSO_3$$

$$HgSO_3+O \rightarrow HgSO_4$$

$$NH_3HSO_3+O \rightarrow NH_3HSO_4.$$

8. The flue-gas purification system, as recited in claim 1, wherein said catalytic absorbent is ammonia, which is adapted as both catalyst for increasing a reaction rate between said catalytic absorbent and said pollutants in said flue-gas, and as reactant involving into said series reactions to form non-toxic compounds of said final products therefrom.

9. The flue-gas purification system, as recited in claim 1, wherein said catalytic absorbent is being delivered into said reactor in a multiple stages manner, wherein each of said stages in said reactor has a specific reactive conditions thereof for mainly reacting a targeted pollutant in said flue-gas while further reacting with other said non-mainly-targeted pollutants.

10. A method of purifying flue-gas, comprising the steps of:
(a) conveying a flue-gas into a reactor;
(b) conveying a catalytic absorbent in gas phase into said reactor for reacting with two or more pollutants of said flue-gas therein to form a series of reactions there between at a water-less consuming manner, so as to form final products in solid state to efficiently purify said flue-gas, wherein a reacting temperature of said catalytic absorbent reacting with said pollutants of said flue-gas is 140° C. or less; and
(c) discharging said purified flue-gas into air.

11. The method, as recited in claim 10, wherein said catalytic absorbent is a mixture of gasified ammonia and an oxygen contained matter.

12. The method, as recited in claim 11, wherein a volume ratio of said gasified ammonia and said oxygen contained matter is 0 to 100.

13. The method, as recited in claim 11, wherein said oxygen contained matter is selected from a group consisting of oxygen, air, oxidized air, gasified hydrogen peroxide, and ozone.

14. The method, as recited in claim 10, wherein said pollutants of said flue-gas is selected from a group consisting of SOx, NOx, $CO_2$, HF, HCl, $HNO_3$, $H_2S$, $H_2SO_4$, $Hg^0$, $Hg^{2+}$, which being removed via a series of processes.

15. The method, as recited in claim 10, wherein the step (b) further comprises a step of providing a UV light to enhance a reaction rate of said final products in solid state being formed said pollutants of said flue-gas under UV environment.

16. The method, as recited in claim 10, wherein said pollutants of said flue-gas comprises mercury, which is being removed via a process in said reactor having chemical equations of said series reactions in said reactor below:

$$Hg+NO_2 \rightarrow HgO+NO$$

$$HgO+NH3 \rightarrow Hg(NH_3)nO \text{ wherein } n=3,4$$

$$Hg(NH3)_3O+4SO_2+3H_2O \rightarrow HgSO_3+3NH_3HSO_3$$

$$HgSO_3+O \rightarrow HgSO_4$$

$$NH_3HSO_3+O \rightarrow NH_3HSO_4.$$

17. The method, as recited in claim 10, wherein said catalytic absorbent is being delivered into said reactor in a multiple stages manner, wherein each of said stages in said reactor has a specific reactive conditions thereof for mainly reacting a targeted pollutant in said flue-gas while further reacting with other said non-mainly-targeted pollutants.

18. The method, as recited in claim 10, further comprising a step of recycling said final products in solid state to form a useful chemical material.

* * * * *